United States Patent [19]

Wargo et al.

[11] Patent Number: 4,716,462
[45] Date of Patent: Dec. 29, 1987

[54] MOTION ADAPTIVE TELEVISION SIGNAL PROCESSING SYSTEM

[75] Inventors: Robert A. Wargo, Ringoes; Leopold A. Harwood, Bridgewater; Dalton H. Pritchard, Princeton; Michael S. Chartier, Sayerville, all of N.J.

[73] Assignee: RCA Corporation, Princeton, N.J.

[21] Appl. No.: 934,923

[22] Filed: Nov. 25, 1986

[51] Int. Cl.$^4$ ............................................. H04N 5/21
[52] U.S. Cl. ..................................... 358/166; 358/11; 358/37; 358/140; 358/160
[58] Field of Search ............... 358/133, 135, 136, 105, 358/140, 160, 11, 166, 167, 36, 37

[56] References Cited

U.S. PATENT DOCUMENTS

| | | | |
|---|---|---|---|
| 4,530,004 | 7/1985 | Achiha et al. | 358/11 |
| 4,598,309 | 7/1986 | Casey | 358/11 |
| 4,617,589 | 10/1986 | Weckenbrock | 358/31 |
| 4,636,862 | 1/1987 | Hatori | 358/166 |
| 4,651,211 | 3/1987 | Weckenbrock | 358/166 |

FOREIGN PATENT DOCUMENTS

| | | |
|---|---|---|
| 60-57793 | 3/1985 | Japan . |
| 1515551 | 6/1978 | United Kingdom . |
| 2127250 | 4/1984 | United Kingdom . |

OTHER PUBLICATIONS

"NTSC TV Scan Conversion Using Motion Adaptive Processings"; Suzuki et al.; NEC Res. & Develop., No. 77, Apr. 1985, pp. 38–43.

"Video Noise Reduction"; Drewery et al.; BBC Research Department Report; PH-256; Jul. 1984.

*Primary Examiner*—Howard W. Britton
*Attorney, Agent, or Firm*—Paul J. Rasmussen; Eric P. Herrmann; Eugene M. Whitacre

[57] ABSTRACT

A motion adaptive television signal processing system is disclosed. An image change estimator estimates the image change over an image time interval. A television signal processor adaptively processes the signal in response to a control signal. A control signal generator is coupled between the image change estimator and the adaptive television signal processor. The control signal generated exhibits a function substantially described by: $K = Ae^{-b/x}$ where K is the value of the control signal, A is the maximum value the control signal can attain, x is the estimated image change, and b is a constant. In a second embodiment, a second estimator estimates a parameter of the television signal. The relationship of the control signal to the estimated image change is varied as a function of the estimated parameter.

18 Claims, 9 Drawing Figures

MOTION ADAPTIVE TELEVISION SIGNAL PROCESSING SYSTEM

The present invention relates to a television signal processing system providing adaptive processing of a television signal in response to motion-induced image changes in the television signal.

Separation of luminance and chrominance components from a composite video signal is a required step in processing of a television signal. A frame comb filter may perform this separation satisfactorily, provided no image motion has occurred. In the presence of image motion, a line comb filter is preferred over a frame comb filter because it reduces motion induced artifacts, but at a cost of potentially decreased image vertical resolution and the presence of hanging dots at vertical image color transitions, and at diagonal luminance transitions.

An image reproduced from a television signal may be enhanced by forming a double-scanned noninterlaced display, including interstitial lines between the transmitted interlaced lines. A satisfactory interstitial line may be a line from the location corresponding to that of the interstitial line, but from the preceding field, provided no image motion has occurred. In the presence of image motion, an interstitial line interpolated from lines within the same field as that of the interstitial line is preferred, but at the cost of decreased image vertical resolution and line flicker.

In an attempt to provide optimum performance, systems, such as those described above, simultaneously produce differently processed signals. For example, both line comb filtered and frame comb filtered luminance and chrominance components, or both field delayed and line interpolated interstitial signals are generated. One, or the other, or some mix of the two alternative signals is supplied to the remainder of the system, for further processing, based on an estimate of image motion.

Problems have arisen in determining the proper proportions of the differently processed signals as a function of image motion. In the case of luminance/chrominance separation, if too large a proportion of frame comb filtered luminance signal is included in the mix yielding the separated luminance signal, then a motion-induced artifact will be visible in the reproduced image. If too large a proportion of line comb filtered luminance signal is included in that mix, then the vertical resolution in the region of image changes may be reduced and hanging dots may be visible.

In the case of a double-scanned noninterlaced converter, if too large a proportion of field delayed signal is included in the mix generating the interstitial line, then a motion induced artifact (such as serrated edges) will be visible in the motion area. On the other hand, if too large a proportion of line interpolated signal is included in the mix, then the vertical resolution in in the motion area will be reduced and line flicker may be evident. It is desirable to adaptively control, as a function of motion, the processing of the video signal in a manner which will provide signal mixing without unduly degrading image resolution, or increasing motion-induced artifact visibility.

In accordance with principles of the present invention, the difference in the transmitted image is estimated over an image scan time interval. A control signal is generated which is a nonlinear function of the estimated image difference. This control signal is used to control the adaptive processing of the television signal.

In accordance with an aspect of the present invention, the nonlinear function relating the control signal K to the image difference signal x is substantially an exponential function having the form:

$$K = Ae^{-b/x} \qquad (1)$$

where A and b are constants.

In accordance with another aspect of the present invention, an estimate of a parameter of the transmitted image is derived and the nonlinear transfer function is modified in response to the value of the estimated parameter.

In accordance with yet another aspect of the present invention, one processed signal is responsive to a plurality of signals representing lines within a first scan of the image, a second is responsive to a signal representing a line in a different scan. The two are combined in proportion based upon a control signal having a minimum value for relatively small image changes, approaching a maximum value asymptotically for relatively large image changes, and exhibiting a monotonically decreasing slope for intermediate values.

Figure 1:
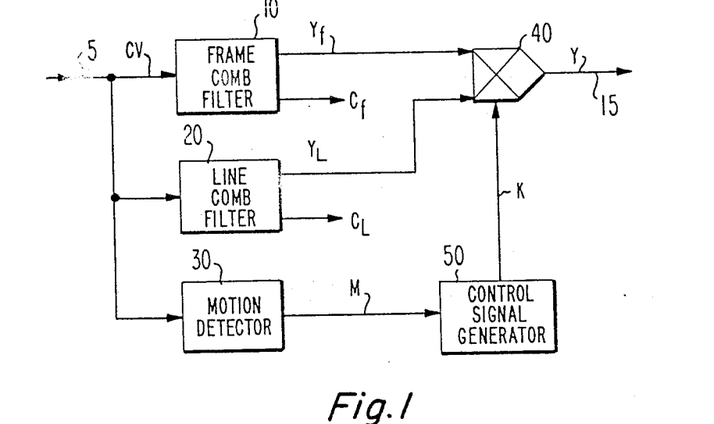
FIG. 1 is a block diagram of a luminance/chrominance separator incorporating a control signal generator according to the present invention.

FIG. 1 illustrates a luminance/chrominance separator. In FIG. 1 an input terminal 5 is coupled to a source (not shown) of a composite video signal which includes a luminance and a chrominance component. Input terminal 5 is coupled to respective input terminals of a frame comb filter 10, a line comb filter 20 and a motion detector 30. Frame comb filter 10 produces at respective output terminals a frame comb filtered luminance component $Y_f$ and a frame comb filtered chrominance component $C_f$. The output terminal producing the frame comb filtered luminance component $Y_f$ is coupled to one input terminal of a signal combiner 40. Line comb filter 20 produces at respective output terminals a line comb filtered luminance component $Y_l$ and a line comb filtered chrominance component $C_L$. The output terminal producing the line comb filtered luminance component $Y_l$ is coupled to a second input terminal of the signal combiner 40. An output terminal of signal combiner 40 is coupled to an output terminal 15 and produces the separated luminance component Y. An output terminal of motion detector 30 provides a signal M which is coupled to an input terminal of control signal generator 50. An output terminal of control signal generator 50 produces a control signal K which is coupled to a control input terminal of signal combiner 40.

In operation, the frame comb filter 10 and the line comb filter 20 produce, in a known manner, respective signals containing the luminance components. Motion detector 30 generates the image difference on a pixel-by-ixel basis over the course of an image scan time interval, for example, for a frame time period. The magnitude of the image difference is provided as signal M. Control signal generator 50 produces control signal K which is a nonlinear function of the motion signal M. Signal combiner 40 combines complementary proportions of the frame comb filtered and line comb filtered luminance signals respectively into the output luminance signal Y as controlled by the control signal K.

When motion signal M indicates that no image difference has occurred over the preceding image time interval, then signal combiner 40 is conditioned to provide substantially only the frame comb filtered luminance signal $Y_f$ as the output luminance signal Y. When motion signal M indicates that a great amount of interframe image difference has occurred, then signal combiner 40 is conditioned to provide substantially only the line comb filtered luminance component $Y_l$ as the luminance output signal Y. For intermediate values of image difference, the proportion of frame and line comb filtered luminance components are varied in signal combiner 40 in accordance with control signal K.

Figure 2:
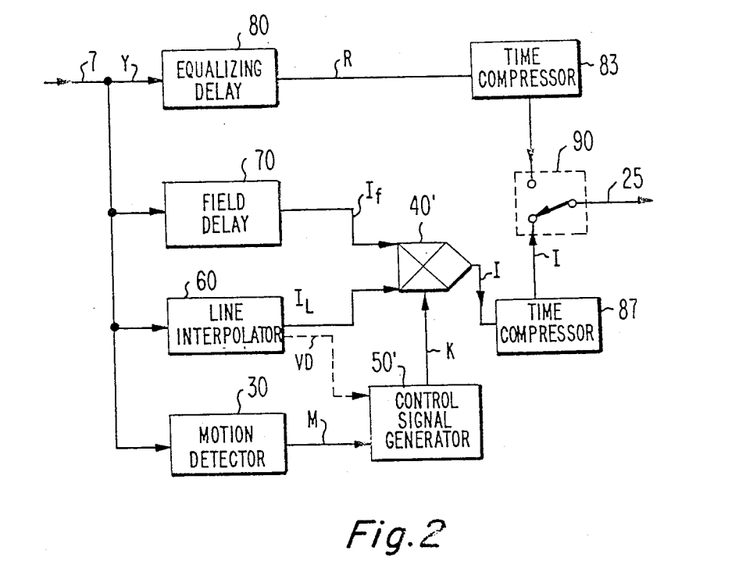
FIG. 2 is a block diagram of a double-scanned noninterlaced converter incorporating a control signal generator according to the present invention.

FIG. 2 illustrates a double-scanned noninterlaced converter. In FIG. 2, an input terminal 7 is coupled to a source (not shown) of a component of a video signal, for example, the luminance component Y. Input terminal 7 is coupled to respective input terminals of an equalizing delay 80, a line interpolator 60, a field delay 70 and a motion detector 30. An output terminal of equalizing delay 80 produces a signal R and is coupled to an input terminal of a time compressor 83. An output terminal of time compressor 83 is coupled to a first terminal of a switch 90. The pole of switch 90 is coupled to an output terminal 25. Output terminal 25 is coupled to display apparatus (not shown) which may reproduce the double-scanned noninterlaced signal representing the transmitted image.

An output terminal of line interpolator 60 produces a signal $I_L$ which is coupled to a first input terminal of a signal combiner 40'. An output terminal of field delay 70 produces a signal $I_f$ which is coupled to a second input terminal of signal combiner 40'. An output terminal of signal combiner 40' produces a signal I, which is coupled to an input terminal of a second time compressor 87. An output terminal of time compressor 87 is coupled to a second input terminal of switch 90.

An output terminal of motion detector 30 produces a signal M which is coupled to an input terminal of a control signal generator 50'. An output terminal of control signal generator 50' produces a control signal K which is coupled to a control input terminal of the signal combiner 40'.

In operation, line interpolator 60 and field delay 70 produce differently processed estimates of an interstitial line I to be displayed between two received lines. Line interpolator 60 produces a line interpolated interstitial line $I_L$ and field delay 70 produces a field delayed interstitial signal $I_f$, in a known manner. Signal combiner 40' combines complementary proportions of interstitial signals $I_L$ and $I_f$ to produce the interstitial signal I.

The signal M indicates the magnitude of the image difference of the component signal Y over the preceeding image interval. The control signal K is a nonlinear function of the motion signal M and controls the proportion of line interpolated and field delayed interstitial signals $I_L$ and $I_f$ respectively, in the interstitial line I. If motion signal M indicates that no image difference has occurred over the preceeding image time interval, then the interstitial signal I is substantially only the field delayed interstitial signal $I_f$. If a great amount of image difference has occurred, then the interstitial signal I is substantially only the line interpolated interstitial signal $I_L$. For intermediate values of interframe difference, the proportion of $I_L$ and $I_f$ is varied in signal combiner 40', in accordance with the control signal K.

Time compressor 83 compresses the amount of time required to scan a received line R to one-half of a horizontal line interval. Time compressor 87 performs a similar function for the interstitial line I. The combination of time compressors 83 and 87 and switch 90 time multiplexes the received line R and the interstitial line I into a single horizontal line time interval. In this way, a double-scanned noninterlaced video signal is produced.

Figure 3:
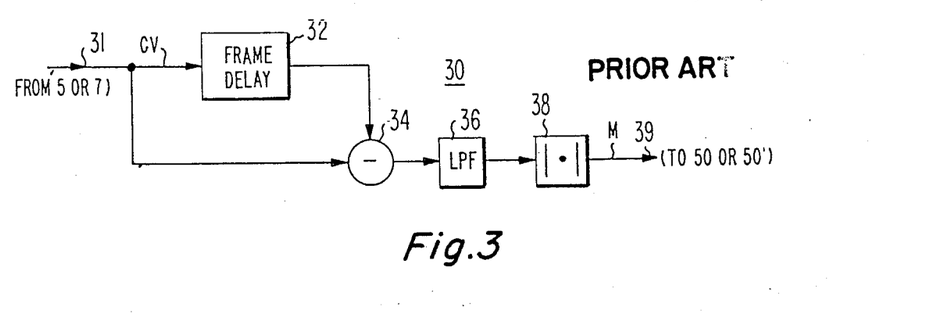
FIG. 3 is a block diagram of a motion detector which may be used in the circuits illustrated in FIGS. 1 or 2.

FIG. 3 is a known image difference detector which may be used as the motion detector 30 in the circuits illustrated in FIGS. 1 and 2. In FIG. 3, an input terminal 31 is coupled to input terminal 5 in FIG. 1 or input terminal 7 in FIG. 2. Input terminal 31 is coupled to respective input terminals of a frame delay 32 and a subtractor 34. An output terminal of frame delay 32 is coupled to a second input terminal of subtractor 34. An output terminal of subtractor 34 is coupled through a low pass filter 36 and an absolute value circuit 38 to an output terminal 39. Output terminal 39 is coupled to control signal generator 50 of FIG. 1 or control signal generator 50' of FIG. 2.

In operation, subtractor 34 produces the difference of the image signals separated by one frame interval. Low pass filter 36 attenuates the frequency band which normally contains color information, leaving only image difference information. Absolute value circuit 38 provides the magnitude of the image difference as signal M at output terminal 39. The above motion detector calculates image differences over an image interval of one frame time period. Other image intervals, such as a field time period, may also be used. In addition, information from within the field presently being processed may be utilized in estimating image motion.

In order to determine the optimum nonlinear function for control signal generators 50 and 50', a series of experiments were performed. A circuit similar to that illustrated in FIG. 1 was implemented in order to separate luminance and chrominance components of a composite video signal. The separated components were then processed to reproduce an image on a picture tube.

A composite video signal was synthesized such that an image was transmitted on a background of dark grey at a level of 20 IRE units, where a signal level of 7.5 IRE units produces a black image and a signal level of 100 IRE units produces a white image. The image was a square, differing from the background by a predetermined number of IRE units, moving back and forth horizontally on the background. For a frame comb terminals 41 and 42 are combined in adder 44. For example, if K=¼A, then ¼A times the signal from input terminal 42 and A−¼A=¾A times the signal from input terminal 41 are combined in adder 44. If A=1, then complementary proportions of the input signals are combined in adder 44.

Figure 4:
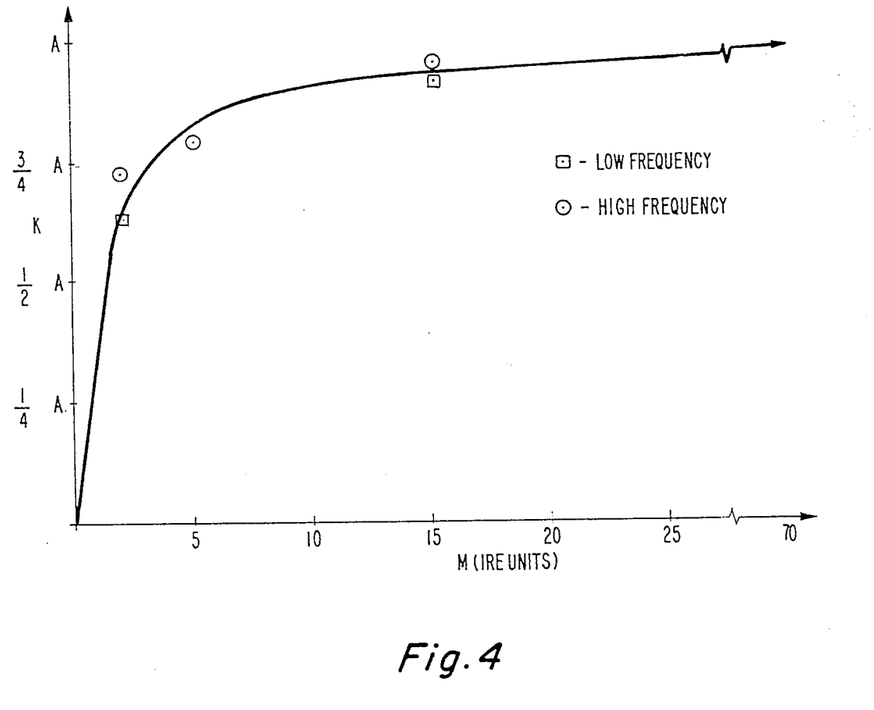
FIG. 4 illustrates a transfer function of the control signal generator illustrated in FIGS. 1 or 2.

A control signal generator 50' having the transfer function illustrated in FIG. 4 may be used advantageously in a double-scanned noninterlaced converter illustrated in FIG. 2. In such a double-scanned noninterlaced converter, a tradeoff is made between line flicker and loss of vertical resolution arising from line interpolated interstitial signals; and motion induced artifacts, such as serrated edges, arising from field delayed interstitial signals.

Further testing has determined that, for unchanging images the percentage of line interpolated interstitial signal should be no greater than 36/127, and for changing images the percentage should be no less than 80/127. Because image differences may sometimes be caused by noise, it cannot be determined whether a low valued image difference signal output from a motion detector, is noise in an unchanging image or a motion-induced image difference in a low contrast image. Thus, a selection of 36/127 or 80/127 may not be correct for every instance.

Figure 8:
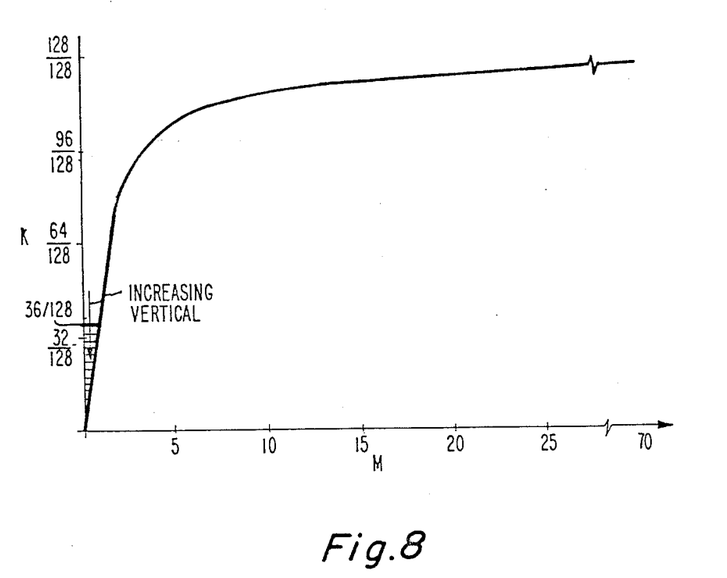
FIG. 8 illustrates a transfer function of the control signal generator which may be used in the circuit illustrated in FIG. 2.

FIG. 8 illustrates a transfer function for the control signal generator 50' (of FIG. 2) which alleviates the above problem to some extent. The heavy curve duplicates the transfer of function curve illustrated in FIG. 4 with the exception that a minimum value of $K_f$ equal to 36/128 is established. Unchanging images thus are processed properly when low valued image differences are detected. However, if these differences are caused by image motion, then some degradation may be experienced. Because the curve reaches a K value of 80/128 when image difference signal M has a value corresponding to a difference of 2 IRE units over the image scan time interval (see Table I above), this degradation is quickly eliminated by larger image changes.

Large vertical transitions in unchanging images result in flicker if there is an image difference caused by noise. This noise is more visible in the brighter areas of the vertical transition than it would be in the darker areas. An attempt to minimize this degradation in image quality entails detecting vertical detail energy and modifying the transfer function based on the level of detected vertical detail energy. As an increasing level of vertical detail information is detected, the minimum level $K_f$ of the control signal K is decreased from 36/128 toward 0. Thus, as vertical detail energy increases, more field delayed signal is mixed in with the line interpolated signal to form the interstitial signal.

Referring again to FIG. 2, line interpolator 60 supplies at a second output terminal a vertical detail information signal VD (indicated in phantom) which is coupled to a second input terminal of control signal generator 50'. Control signal generator 50' exhibits the transfer function illustrated in FIG. 8 and is modified by the level of the vertical detail information signal supplied from line interpolator 60.

Figure 7:
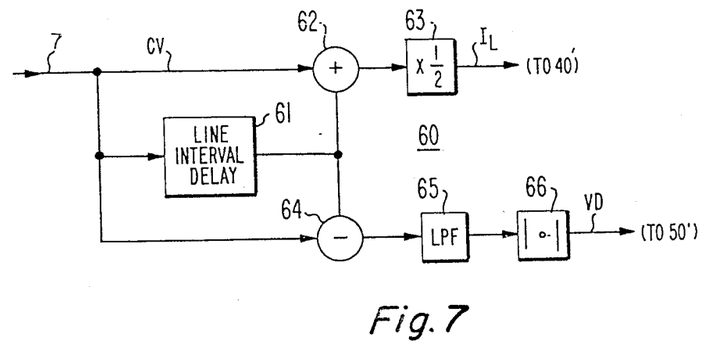
FIG. 7 is a block diagram of a line interpolator which may be used in the circuit illustrated in FIG. 2.

FIG. 7 illustrates a line interpolator 60 which may be used in the phantom version of the double-scanned noninterlaced converter illustrated in FIG. 2. The input terminal 7 is coupled to an input terminal of a line interval delay element 61, and respective first input terminals of an adder 62 and a subtractor 64. An output terminal of line interval delay element 61 is coupled to respective second input terminals of adder 62 and subtractor 64. An output terminal of adder 62 is coupled to a scaling circuit 63 which multiplies the signal at its input terminal by one-half. An output terminal of scaling circuit 63 produces a signal $I_L$ which is coupled to an input terminal of signal combiner 40' (of FIG. 2). An output terminal of subtractor 64 is coupled through low pass filter 65 to an absolute value circuit 66. Low pass filter 65 attenuates the spectral portion of the input signal which normally contains chrominance information, leaving only vertical detail information. Absolute value circuit 66 generates a signal VD representing the magnitude of the vertical detail information and is coupled to the control signal generator 50' (of FIG. 2).

Figure 9:
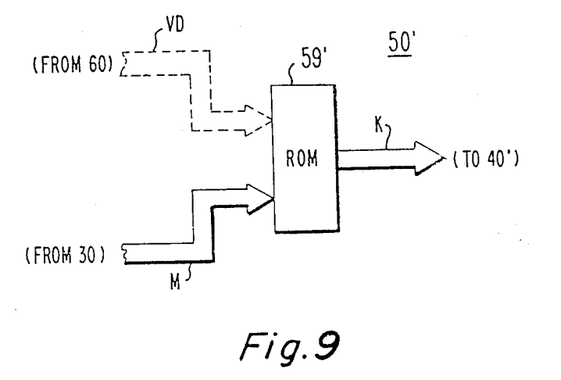
FIG. 9 is a digital implementation of the control signal generator having a transfer function illustrated in FIG. 9 which may be used in the circuit illustrated in FIG. 2.

FIG. 9 illustrates a control signal generator 50' which may be used in the phantom version of the circuit illustrated in FIG. 2. In FIG. 9, signal VD from line interpolator 60 (of FIG. 2) is supplied to a subset of address input terminals of ROM 59'. Signal M from motion detector 30 (of FIG. 2) is supplied to the remainder of the address input terminals of ROM 59'. Output terminals of ROM 59' produce control signal K and are coupled to signal combiner 40' (of FIG. 2).

In operation, ROM 59' has a plurality of different transfer function curves, such as are illustrated in FIG. 8. Interframe difference signal M addresses a location having the corresponding value of K for a selected transfer function curve preprogrammed into it. This control signal K is supplied to the signal combiner 40' (of FIG. 2). Which transfer function curve is selected is determined by the value of the signal VD. As illustrated in FIG. 8, as the value of the signal VD increases, the minimum value $K_f$ of K decreases.

The present invention pertains to the nonlinear transfer function relating the interframe difference signal M to the proportionality constant K in such a manner that an optimum tradeoff between interframe difference (motion) artifacts and intraframe (line flicker, loss of vertical resolution) artifacts results. Although illustrated in exemplary embodiments for luminance/chrominance separation and double-scanned noninterlaced conversion; other applications in which interframe difference signals can affect visible adaptive processing may also use the principles of the invention advantageously.

What is claimed is:
1. A television signal processing system, comprising:
a source of a television signal;
means, coupled to said source, for estimating image changes over at least one image scan time interval;
means, coupled to said source, for adaptively processing said television signal in response to a control signal; and
means, coupled between said estimator and said adaptive processor, for generating said control signal exhibiting a function substantially described by:

$$K = Ae^{-b/x}$$

where K is the value of said control signal, A is the maximum value said control signal can attain, x is said estimated change, and b is a constant.
2. The system of claim 1, wherein b=0.924.
3. The system of claim 1, wherein said control signal generator comprises a read only memory.
4. A television signal processing system, comprising:
a source of a television signal;

filtered television signal, a motion artifact is visible consisting of a shadow at the right and left hand edges of the square. For example, for a background level of 20 IRE units, and a square at 22 IRE units, the magnitude M of the image change in the shadow regions is 2 IRE units.

This display was then observed and the control signal K varied manually from a value resulting in only frame comb filtered components being displayed, toward a value which would result in only line comb filtered components being displayed. The value of K for which the shadow became unnoticeable was noted.

For example, when K was adjusted to 80/127 for a 2 IRE image difference, the shadow was just below visibility. The test was then repeated for a square varying from the 20 IRE unit background by the different number of IRE units listed in Table I, and the optimum K noted. This entire series of tests was repeated for a background level of 35 IRE units, with no significant differences. Table I below illustrates the results of these tests.

The solid square moving horizontally yields results for low frequency luminance motion. This series of tests was repeated for thin vertical lines differing by predetermined IRE unit levels from background levels of first 20 and then 30 IRE units. Such a pattern has high frequency luminance information. Table II below displays the results of the series of tests for the high frequency luminance information. Pertinent empirically derived points are illustrated in FIG. 4, and define points of a function which provides the optimum mixture of frame delay processing yielding highest vertical resolution without visible motion induced artifacts.

TABLE I

| M(IRE) | K |
|---|---|
| 2 | 80/127 |
| 15 | 116/127 |
| 35 | 123/127 |
| 55 | 127/127 |

TABLE II

| M(IRE) | K |
|---|---|
| 2 | 92/127 |
| 5 | 100/127 |
| 15 | 120/127 |
| 35 | 124/127 |
| 55 | 127/127 |

Based upon these tables, a mathematical equation was derived which approximates the function represented by these points. This function is:

$$K = Ae^{-0.924/M} \quad (2)$$

where A is the constant which determines the maximum value that K may take and M is the image difference in IRE units over the frame time interval at a particular horizontal and vertical location. Although this equation represents the empirically derived data, other mathematical formulae may just as accurately represent this data. It is the empirical data which defines the function, a mathematical formulation merely approximates the function and allows estimation of the proper function at points in between the empirically derived data points.

Figure 5:
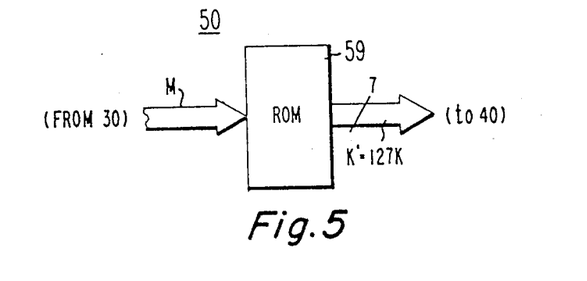
FIG. 5 is a block diagram of a digital implementation of a control signal generator having the transfer function illustrated in FIG. 4, which may be used in the circuits illustrated in FIGS. 1 or 2.

FIG. 5 is a digital implementation of a control signal generator 50 which may be used in the circuit illustrated in FIG. 1. In FIG. 5 a read only memory (ROM) 59 has address input terminals coupled to receive a multibit digital signal M from motion detector 30 (of FIG. 1). Data output terminals of ROM 59 produce a signal K' which is supplied to signal combiner 40 (of FIG. 1). If the multibit digital signal output K' comprises n-bits, then the maximum value that K' can attain is $2^n - 1$. For example, if n=7, the maximum value is 127, and the function may be approximated by the mathematical equation:

$$K' = 127e^{-0.924/M} \quad (3)$$

The control signal K is equal to K'/128, and varies from 0 to 127/128 in steps of 1/128th. In the digital implementation K' may be used with a fixed attenuation of 128, which may be a hardware bit shift. The ROM 59 is preprogrammed so that for each value of M, the location addressed by that value of M contains the corresponding value of K'. Thus, for a digital input having the value M a digital output K' is produced having the value 127K, as described in equation (3) above. The preprogrammed ROM 59 is essentially a table look-up function generator. As described above, the empirically derived points define the function, and the table of values preprogrammed into ROM 59 provides estimates of the function for the input values. Tables of values derived from other mathematical formulae may also provide acceptable estimations of the function.

Figure 6:
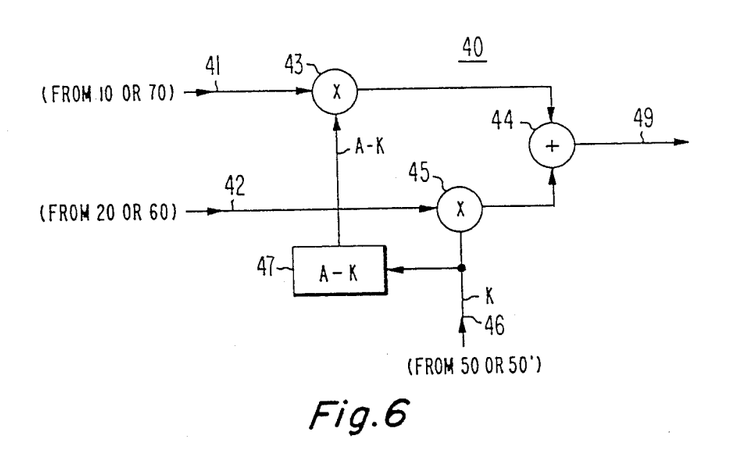
FIG. 6 is a block diagram of a signal combiner which may be used in the circuits illustrated in FIGS. 1 and 2.

FIG. 6 illustrates an embodiment of signal combiner 40 or 40'. In FIG. 6, an input terminal 41 is coupled to the frame comb filter 10 (of FIG. 1) or the field delay 70 (of FIG. 2). Input terminal 41 is coupled to a first input terminal of a multiplier 43. An output terminal of multiplier 43 is coupled to a first input terminal of an adder 44. An output terminal of adder 44 is coupled to an output terminal 49. Output terminal 49 is coupled to the output terminal 15 (of FIG. 1), or the input terminal of time compressor 87 (of FIG. 2).

A second input terminal 42 is coupled to the output terminal of line comb filter 20 (of FIG. 1) or line interpolator 60 (of FIG. 2). Input terminal 42 is coupled to a first input terminal of a second multiplier 45. An output terminal of multiplier 45 is coupled to a second input terminal of adder 44. A control input terminal 46 is coupled to the output terminal of control signal generator 50 (of FIG. 1) or control signal generator 50' (of FIG. 2). Control input terminal 46, carrying the control signal K, is coupled to a second input terminal of multiplier 45 and an input terminal of a function generator 47, which generates the signal A−K where A is the maximum value of control signal K, as described above for equations (1) and (2). An output terminal of function generator 47 is coupled to a second input terminal of multiplier 43.

In operation, multipliers 43 and 45 produce signals having varying proportions of the respective input signals. Adder 44 combines the proportioned signals from multipliers 43 and 45 to produce an output signal at terminal 49 having varying proportions of the input signals from terminals 41 and 42, as controlled by the control signal K from input terminal 46. For example, when control signal K=0 then 0 times the signal from input terminal 42 and (A−0)=A times the signal from input terminal 41 are combined in adder 44. When control signal K=A then A times the signal from input terminal 42 and (A−A)=0 times the signal from input terminal 41 is combined in adder 44. At intermediate levels of K, varying proportions of input signals from means, coupled to said source, for estimating image changes over at least one image scan-time interval;

means, coupled to said source, for adaptively processing said television signal in response to a control signal; and means, coupled between said estimator and said adaptive processor, for generating said control signal exhibiting a function substantially described by:

$$K = K_f$$

for x less than a predetermined value, and $$K = Ae^{-b/x}$$

otherwise, where K is the value of said control signal, A is the maximum value said control signal can attain, x is said estimated change, and b is a constant and $K_f$ is a predetermined minimum value.

5. The system of claim 4, wherein b=0.924.

6. The system of claim 4, wherein said control signal generator comprises a read only memory.

7. A television signal processing system comprising:
a source of a television signal;

means, coupled to said source, for estimating image changes over at least one image scan time interval;

means, coupled to said source, for estimating a parameter of said television signal;

means, coupled to said source, for adaptively processing said television signal in response to a control signal; and means, having respective input terminals coupled to said image change and said parameter estimators, and having an output terminal coupled to said adaptive processor, for generating said control signal having a minimum value for relatively small estimated changes, approaching a maximum value assymptotically for relatively large estimated changes, and exhibiting a monotonically decreasing slope for intermediate control signal values.

8. The system of claim 7, wherein the relationship of said control signal to said estimated image changes varies as a function of said estimated parameter.

9. The system of claim 7, wherein said control signal generator comprises a read only memory.

10. The system of claim 7, wherein said control signal generator exhibits a function described by:

$$K = K_f$$

for x less than a predetermined value, and $$K = Ae^{-b/x}$$

otherwise, where K is the value of said control signal, A is said maximum value, x is said estimated change, b is a constant, and $K_f$ is said minimum value.

11. The system of claim 10, wherein $K_f$ varies as a function of said estimated parameter.

12. The system of claim 10, wherein b=0.924.

13. A television signal processing system, comprising:
a source of a television signal representing successive scans of a image, each scan comprising a plurality of lines;

means, coupled to said source, for estimating image changes over at least one image scan time interval;

first processing means, coupled to said source, responsive to a plurality of signals representing respective lines within a first scan of said image;

second processing means, coupled to said source, responsive to a signal representing a line in a scan of said image other than said first scan;

means, having respective input terminals coupled to said first and second processing means, for combining the signals at said input terminals in proportion based on a control signal; and means, coupled between said estimator and said combining means for generating said control signal having a minimum value for relatively small estimated image changes, approaching a maximum value assymptotically for relatively large estimated image changes, and exhibiting a monotonically decreasing slope for intermediate control signal values.

14. The system of claim 13, wherein said control signal generator comprises a read only memory.

15. The system of claim 13, wherein said control signal generator exhibits a function described by:

$$K = Ae^{-b/x}$$

where K is the value of said control signal, A is said maximum value, x is said estimated change, and b is a constant.

16. The system of claim 15, wherein b=0.924.

17. The system of claim 13, wherein said control signal generator exhibits a function described by:

$$K = K_f$$

for x less than a predetermined value, and $$K = Ae^{-b/x}$$

otherwise, where K is the value of said control signal, A is said maximum value, x is said estimated change, b is a constant, and $K_f$ is said minimum value.

18. The system of claim 17, wherein b=0.924.

* * * * *